(12) United States Patent
Machida

(10) Patent No.: US 8,904,242 B2
(45) Date of Patent: Dec. 2, 2014

(54) CLOUD SERVICE RECOVERY TIME PREDICTION SYSTEM, METHOD AND PROGRAM

(75) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/981,249

(22) PCT Filed: Aug. 2, 2012

(86) PCT No.: PCT/JP2012/004906
§ 371 (c)(1),
(2), (4) Date: Jul. 23, 2013

(87) PCT Pub. No.: WO2013/035243
PCT Pub. Date: Mar. 14, 2013

(65) Prior Publication Data
US 2013/0305083 A1    Nov. 14, 2013

(30) Foreign Application Priority Data
Sep. 8, 2011   (JP) .................................. 2011-196064

(51) Int. Cl.
G06F 11/00   (2006.01)
H04L 29/14   (2006.01)
G06F 11/30   (2006.01)

(52) U.S. Cl.
CPC .............. *H04L 29/14* (2013.01); *G06F 11/008* (2013.01); *G06F 11/30* (2013.01)
USPC .......................................... 714/47.3; 714/57

(58) Field of Classification Search
CPC ............ G06F 11/3409; G06F 11/3466; G06F 11/0709; G06F 11/327; G06F 11/0769
USPC ............................ 714/47.3, 57; 709/223, 224
See application file for complete search history.

(56) References Cited

U.S. PATENT DOCUMENTS

| | | | |
|---|---|---|---|
| 6,907,551 B2 * | 6/2005 | Katagiri et al. .................. | 714/57 |
| 7,509,518 B2 * | 3/2009 | Bailey et al. ....................... | 714/1 |
| 2010/0241903 A1 * | 9/2010 | Goldszmidt et al. ............. | 714/38 |
| 2012/0254669 A1 * | 10/2012 | Xia et al. ...................... | 714/47.2 |
| 2013/0086194 A1 * | 4/2013 | Estes et al. ..................... | 709/207 |

FOREIGN PATENT DOCUMENTS

| | | | |
|---|---|---|---|
| JP | 2002-108728 A | 4/2002 |
| JP | 2003-179614 A | 6/2003 |
| JP | 2004-364154 A | 12/2004 |
| JP | 2006-313399 A | 11/2006 |

(Continued)

OTHER PUBLICATIONS

Yaguchi, "Fujitsu 'reduces Operation Workload up to 70%' with New Operation Management Software", [online], Nikkei Computer, Nov. 11, 2004, Internet, with English Translation.

(Continued)

*Primary Examiner* — Philip Guyton
(74) *Attorney, Agent, or Firm* — Sughrue Mion, PLLC

(57) ABSTRACT

A recovery schedule storing means (81) stores a recovery schedule for a failure of a cloud service with respect to each computing resource type or each application service. A resource usage profile storing means (82) stores a resource usage profile specifying an application service or a computing resource used when each user uses the cloud service. A recovery time predicting means (83) predicts a service recovery time with respect to each user based on the resource usage profile and the recovery schedule. A recovery time presenting means (84) presents the predicted service recovery time to the user.

11 Claims, 13 Drawing Sheets

(56) References Cited

FOREIGN PATENT DOCUMENTS

| | | |
|---|---|---|
| JP | 2007-041646 A | 2/2007 |
| JP | 2009-211618 A | 9/2009 |
| JP | 2010-146198 A | 7/2010 |

OTHER PUBLICATIONS

Google, "Google AppEngine", [online], [Search on Aug. 19, 2011], Internet <URL:http://code.google.com/status/appengine>, Cited in the Applicant's Specification beginning at paragraph [0011].

Amazon, "amazon web service Service Health Dashboard", [online], [Search on Aug. 19, 2011], Internet <URL:http://status.aws.amazon.com/>, Cited in the Applicant's Specification beginning at paragraph [0011].

Yaguchi, "Fujitsu ga Un'yo Kanri Soft no Shin Seihin de 'Saidai 70% Un'yo Fuka o Keigen suru'", [online], Nikkei Computer, Nov. 11, 2004, [Searched on Oct. 1, 2012], Internet. Concise English Explanation is provided in ISR.

International Search Report for PCT Application No. PCT/JP2012/004906 mailed on Oct. 9, 2012.

* cited by examiner

FIG. 10

| USER | VIRTUAL MACHINE | STORAGE REGION | SUPPLEMENTARY SERVICE |
|---|---|---|---|
| A | ONE STANDARD-TYPE VIRTUAL MACHINE | VOLUME 21 | MONITORING SERVICE |
| B | TWO STANDARD-TYPE VIRTUAL MACHINES | VOLUME 22 VOLUME 11 | LOAD BALANCER SERVICE MONITORING SERVICE |
| C | TWO STANDARD-TYPE VIRTUAL MACHINES | VOLUME 23 | MONITORING SERVICE |
| D | TWO STANDARD-TYPE VIRTUAL MACHINES | VOLUME 24 VOLUME 25 | VPN SERVICE |
| E | ONE STANDARD-TYPE VIRTUAL MACHINE | VOLUME 12 | |
| F | TWO STANDARD-TYPE VIRTUAL MACHINES | VOLUME 13 | LOAD BALANCER SERVICE MONITORING SERVICE |
| | | | |

FIG. 11

| RESOURCE TYPE | RESOURCE IDENTIFICATION NAME | STATE | SUPPLEMENTARY INFORMATION |
|---|---|---|---|
| VIRTUAL MACHINE | VIRTUAL MACHINE 1 | STOP BY FAULT | STOP BY PHYSICAL SERVER FAULT AFFECT VIRTUAL MACHINES OF USERS A TO F |
| | ... | ... | ... |
| | VIRTUAL MACHINE k | STOP BY FAULT | STOP BY PHYSICAL SERVER FAULT AFFECT VIRTUAL MACHINES OF USERS A TO F |
| STORAGE | VOLUME 21 | DATA MISMATCH | RECOVERY FROM BACKUP DATA IS REQUIRED |
| | ... | ... | ... |
| | VOLUME 2m | DATA MISMATCH | RECOVERY FROM BACKUP DATA IS REQUIRED |
| SERVICE | MONITORING SERVICE | STOP | |
| | VPN SERVICE | STOP | SWITCH FAILURE |
| | LOAD BALANCER SERVICE | STOP | |

FIG. 12

VIRTUAL MACHINE RECOVERY SCHEDULE

| TIME | RECOVERY STATUS |
|---|---|
| 12:00 | START RECOVERY OPERATION |
| 12:30 | FOUR STANDARD-TYPE VIRTUAL MACHINES ARE AVAILABLE |
| 13:00 | FOUR STANDARD-TYPE VIRTUAL MACHINES ARE AVAILABLE |
| 14:00 | ALL VIRTUAL MACHINES ARE AVAILABLE → RECOVERY OPERATION IS COMPLETED |

STORAGE RECOVERY SCHEDULE

| TIME | RECOVERY STATUS |
|---|---|
| 12:00 | START RECOVERY OPERATION |
| 12:20 | RECOVER VOLUME 21 |
| 12:40 | RECOVER VOLUME 22 |
| 13:00 | RECOVER VOLUME 23 |
| 13:15 | RECOVER VOLUME 24 |
| 13:30 | RECOVER VOLUME 25 |
| ... | ... |
| 17:00 | RECOVERY OF ALL FAILURE VOLUMES IS COMPLETED |

SUPPLEMENTARY SERVICE RECOVERY SCHEDULE

| TIME | RECOVERY STATUS |
|---|---|
| 12:00 | START RECOVERY OPERATION |
| 12:30 | RESUME MONITORING SERVICE AND LOAD BALANCER SERVICE |
| 14:30 | RESUME VPN SERVICE |

FIG. 13

| USER | VIRTUAL MACHINE RECOVERY SCHEDULE TIME | STORAGE REGION RECOVERY SCHEDULE TIME | SUPPLEMENTARY SERVICE RECOVERY SCHEDULE TIME | SERVICE RECOVERY SCHEDULE TIME |
|---|---|---|---|---|
| A | ONE STANDARD-TYPE VIRTUAL MACHINE 12:30 | VOLUME 21 12:20 | MONITORING SERVICE 12:30 | 12:30 |
| B | TWO STANDARD-TYPE VIRTUAL MACHINES 12:30 | VOLUME 22 12:40 | LOAD BALANCER SERVICE 12:30 MONITORING SERVICE 12:30 | 12:40 |
| C | TWO STANDARD-TYPE VIRTUAL MACHINES 12:30 | VOLUME 23 13:00 | MONITORING SERVICE 12:30 | 13:00 |
| D | TWO STANDARD-TYPE VIRTUAL MACHINES 12:30 | VOLUME 24 13:15 VOLUME 25 13:30 | VPN SERVICE 14:30 | 14:30 |
| E | ONE STANDARD-TYPE VIRTUAL MACHINE 12:30 | VOLUME 12 | | 12:30 |
| F | TWO STANDARD-TYPE VIRTUAL MACHINES 12:30 | VOLUME 13 | LOAD BALANCER SERVICE 12:30 MONITORING SERVICE 12:30 | 12:30 |
| | | | | |

FIG. 14

VIRTUAL MACHINE RESERVATION INFORMATION

| USER | RESERVED VIRTUAL MACHINE | RESERVATION START TIME |
|---|---|---|
| A | ONE STANDARD-TYPE VIRTUAL MACHINE | 12:30 – |
| B | TWO STANDARD-TYPE VIRTUAL MACHINES | 12:30 – |
| C | ONE STANDARD-TYPE VIRTUAL MACHINE | 12:30 – |
| | ONE STANDARD-TYPE VIRTUAL MACHINE | 13:00 – |
| D | TWO STANDARD-TYPE VIRTUAL MACHINES | 13:00 – |
| E | ONE STANDARD-TYPE VIRTUAL MACHINE | 13:00 – |
| F | TWO STANDARD-TYPE VIRTUAL MACHINES | 14:00 – |
| | | |

FIG. 15

| USER | VIRTUAL MACHINE RECOVERY SCHEDULE TIME | STORAGE REGION RECOVERY SCHEDULE TIME | SUPPLEMENTARY SERVICE RECOVERY SCHEDULE TIME | SERVICE RECOVERY SCHEDULE TIME |
|---|---|---|---|---|
| A | ONE STANDARD-TYPE VIRTUAL MACHINE 12:30 | VOLUME 21 12:20 | MONITORING SERVICE 12:30 | 12:30 |
| B | TWO STANDARD-TYPE VIRTUAL MACHINES 12:30 | VOLUME 22 12:40 | LOAD BALANCER SERVICE 12:30 MONITORING SERVICE 12:30 | 12:40 |
| C | TWO STANDARD-TYPE VIRTUAL MACHINES 13:00 | VOLUME 23 13:00 | MONITORING SERVICE 12:30 | 13:00 |
| D | TWO STANDARD-TYPE VIRTUAL MACHINES 13:00 | VOLUME 24 13:15 VOLUME 25 13:30 | VPN SERVICE 14:30 | 14:30 |
| E | ONE STANDARD-TYPE VIRTUAL MACHINE 13:00 | VOLUME 12 | | 13:00 |
| F | TWO STANDARD-TYPE VIRTUAL MACHINES 14:00 | VOLUME 13 | LOAD BALANCER SERVICE 12:30 MONITORING SERVICE 12:30 | 14:00 |
| | | | | |

FIG. 16

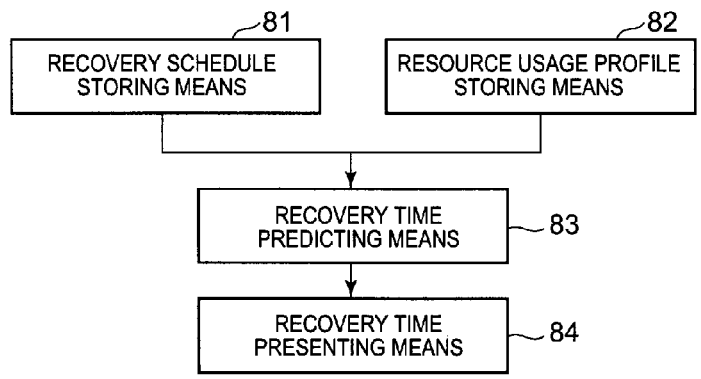

CLOUD SERVICE RECOVERY TIME PREDICTION SYSTEM, METHOD AND PROGRAM

This application is a National Stage Entry of PCT/JP2012/004906 filed Aug. 2, 2012, which claims priority from Japanese Patent Application 2011-196064 filed Sep. 8, 2011, the contents of all of which are incorporated herein by reference, in their entirety.

TECHNICAL FIELD

The invention relates to a cloud service recovery time prediction system, a cloud service recovery time prediction method, and a cloud service recovery time prediction program that predict a service recovery time with respect to each service user in the event of a system failure accompanied with a fault in a plurality of computing resources.

BACKGROUND ART

Recently, a cloud service for providing computing resources such as virtual machines and storages to users through a network is widely used. A user of a cloud service can reduce costs for possession and management of computing resources by renting computing resources from a service provider. Patent Literature 1 describes an example of an exemplary embodiment of the cloud service.

With an increase in the number of users of a cloud service, the number of users affected by a service failure also increases. In a large-scale cloud service, hundreds of thousands of users may be affected by a partial system failure. However, the user cannot directly control failure recovery processing because the user cannot know the configuration and management method of the cloud service and the details of the failure. The user has to wait until the service is available again since the failure is eliminated by the cloud service provider.

Inability to know the detailed situation of failure recovery causes the aggravation of the anxiety of the user. Therefore, there is a possibility that access such as queries from users and retrial by users will rush. A rapid increase in access from users causes a new trouble such as system performance degradation and function loss. In order to alleviate the stress of a user associated with such a service failure, Web sites called a "dashboard" are provided by some cloud service providers. Through the Web site, efforts for service recovery are disclosed to the users.

Patent Literature 2 describes a method for disclosing failure information by generating a Web page for disclosing the failure information, based on the failure information received from a user. By quickly disclosing failure information through Web in the event of a failure, the stress of a user affected by the failure can be alleviated.

Also, Patent Literature 3 describes a failure notification method for notifying network failure information to a user. The failure notification method described in Patent Literature 3 notifies failure information to each user by e-mail or the like based on an application reservation status of the user when a failure occurs in a system associated with communication such as a videoconference application. This method determines an affection on the user and notifies failure information, based on an application reservation period of the user and a temporal overlap of the period from failure occurrence to failure recovery.

Also, Patent Literature 4 describes a method for notifying necessary information to a user when a network service is unavailable. In the method described in Patent Literature 4, a server machine manages identification information of a client machine using a resource provided in a network service, the type of a program operating in the client machine using the resource, and the type of a user of a program of the client machine. When the network service is unavailable due to the occurrence of a predetermined problem in the resource of the server machine, network service information based on the resource provided in the network service is notified to the client machine.

Also, NPL 1 discloses a current state of a cloud service provided in Google (registered trademark) AppEngine. Also, NPL 2 discloses a current state of a cloud service provided in Amazon (registered trademark) EC2. When a failure occurs in the cloud service, a failure occurrence place, a service recovery schedule time, and the like are disclosed in the Web site. Since the information is updated in accordance with a service recovery status, the user can provide for service resumption with reference to this site.

Also, Patent Literature 5 describes a method for monitoring a data recovery available time in a storage system that performs asynchronous remote copy between a plurality of storage devices. In the method described in Patent Literature 5, the newest or equivalent data retained in a buffer of a first storage device are accumulated at predetermined time intervals together with time information. A recovery time is calculated with reference to a predetermined time based on at least one of the accumulated information, the oldest or equivalent data at a predetermined time, and the number of accumulated data by using data stored in a second storage device.

CITATION LIST

Patent Literature

PLT1: Japanese Patent Application Laid-open (JP-A) No. 2010-146198
PLT2: JP-A No. 2002-108728
PLT3: JP-A No. 2004-364154
PLT4: JP-A No. 2007-41646
PLT5: JP-A No. 2010-146198

Non Patent Literature

NPL1: Google, "Google AppEngine", [online], [Search on Aug. 19, 2011], Internet <URL:http://code.google.com/status/appengine>
NPL2: Amazon, "amazon web service SERVICE HEALTH DASHBOARD", [online], [Search on Aug. 19, 2011], Internet <URL:http://status.aws.amazon.com/>

SUMMARY OF INVENTION

Technical Problem

In general, the type and amount of a computing resource required by a user differs from user to user. Therefore, the failure information disclosed by using the method described in Patent Literature 2, and the information disclosed in NPL 1 and NPL 2 are not necessarily suitable for each user.

For example, the information disclosed in NPL 1 or NPL 2 is information related to the recovery time for the whole service. In this case, even when a part of the service is recovered and becomes available for some users, service users cannot know whether the whole service is recovered or not. That is, the service user has to wait until the recovery of all services according to recovery prediction time information disclosed by a service provider at an event of a failure in a cloud service.

On the other hand, when a service recovery time is disclosed based on the recovery prediction time of a part of computing resources, not all the users can resume the use of the service at the predicted time. In general, since the type and amount of a computing resource required by each user differs from user to user, the user may not resume the use of a service just because a part of computing resources is available. That is, even when a recovery prediction time of a part of computing resources is disclosed, users cannot resume their use of services until all the necessary resources are recovered.

Thus, the method described in Patent Literature 2 cannot present a different recovery time (specifically, time to resume the use of a service) for each user with respect to a failure in a cloud service in which a failure occurs in a plurality of types of computing resources.

A service provided in the cloud service is not necessarily a service that requires advance reservation for use. Therefore, the method described in Patent Literature 3 cannot respond to the case where a failure occurs in a service that is used by a user without reservation mechanism.

Also, the method described in Patent Literature 4 notifies the unavailability of a network service to a client that uses a resource in which a failure has occurred. However, since Patent Literature 4 does not describe how to calculate a prediction time until the recovery of a service, a specific prediction method thereof is unclear.

Therefore, an exemplary object of the invention is to provide a cloud service recovery time prediction system, a cloud service recovery time prediction method, and a cloud service recovery time prediction program that can predict a cloud service recovery time with respect to each user when a user-requested service is unavailable due to a failure of a cloud service provided by using a plurality of types of computing resources.

Solution to Problem

According to an exemplary aspect of the invention, a cloud service recovery time prediction system includes: a recovery schedule storing means for storing a recovery schedule specifying a schedule for recovering a plurality of types of computing resources provided in a cloud service or an application service that is a service provided in the cloud service when a failure occurs in the computing resources or the application service, with respect to each computing resource type or each application service; a resource usage profile storing means for storing a resource usage profile specifying a computing resource used when each user uses the cloud service, with respect to each user; a recovery time predicting means for specifying a computing resource or an application service used when a user uses the cloud service, from the resource usage profile, and predicting a time for recovering all specified computing resources or an application service, based on the recovery schedule, to predict a recovery time of the cloud service used by the user; and a recovery time presenting means for presenting the predicted service recovery time to the user.

According to an exemplary aspect of the invention, a cloud service recovery time prediction method that predicts a recovery time when a failure occurs in a plurality of types of computing resources provided in a cloud service or in an application service that is a service provided in the cloud service, includes: identifying computing resources and application services used by a user of the cloud service, with reference to a resource usage profile storing means storing a resource usage profile specifying a computing resource used by each user of the cloud service with respect to each user, from the resource usage profile stored in the resource usage profile storing means; extracting a recovery schedule from a recovery schedule storing means storing a recovery schedule specifying a schedule for recovering the computing resources or the application service with respect to each computing resource type or each application service when a failure occurs in the computing resources or the application service; predicting a recovery time of the cloud service used by the user by predicting a time for recovering all specified computing resources or an application service, based on the extracted recovery schedule; and presenting the predicted service recovery time to the user.

According to an exemplary aspect of the invention, a cloud service recovery time prediction program applied to a computer that predicts a recovery time when a failure occurs in a plurality of types of computing resources provided in a cloud service or in an application service that is a service provided in the cloud service, causes the computer to execute: a recovery time predicting process of identifying computing resources and application services used by a user of the cloud service, with reference to a resource usage profile storing means storing a resource usage profile specifying a computing resource used by each user of the cloud service with respect to each user, from the resource usage profile stored in the resource usage profile storing means, extracting a recovery schedule from a recovery schedule storing means storing a recovery schedule specifying a schedule for recovering the computing resources or the application service with respect to each computing resource type or each application service when a failure occurs in the computing resources or the application service, and predicting a recovery time of the cloud service used by the user by predicting a time for recovering all specified computing resources or an application service, based on the extracted recovery schedule; and a recovery time presenting process of presenting the predicted service recovery time to the user.

Advantageous Effects of Invention

According to the invention, a cloud service recovery time can be predicted with respect to each user when a user-requested service is unavailable due to a failure of a cloud service provided by using a plurality of types of computing resources.

BRIEF DESCRIPTION OF DRAWINGS

FIG. 10 It depicts an illustration diagram illustrating a portion of a resource profile of a cloud service user.

FIG. 11 It depicts an illustration diagram illustrating an example of failure status data.

FIG. 12 It depicts an illustration diagram illustrating an example of a resource recovery schedule.

FIG. 13 It depicts an illustration diagram illustrating an example of the result of calculation of a service recovery schedule time with respect to each user.

FIG. 14 It depicts an illustration diagram illustrating an example of virtual machine reservation information.

FIG. 15 It depicts an illustration diagram illustrating another example of the result of calculation of a service recovery schedule time with respect to each user.

FIG. 16 It depicts a block diagram illustrating an example of a minimum configuration of a cloud service recovery time prediction system according to the invention.

DESCRIPTION OF EMBODIMENTS

Hereinafter, exemplary embodiments of the invention will be described with reference to the drawings.

Exemplary Embodiment 1

Figure 1:
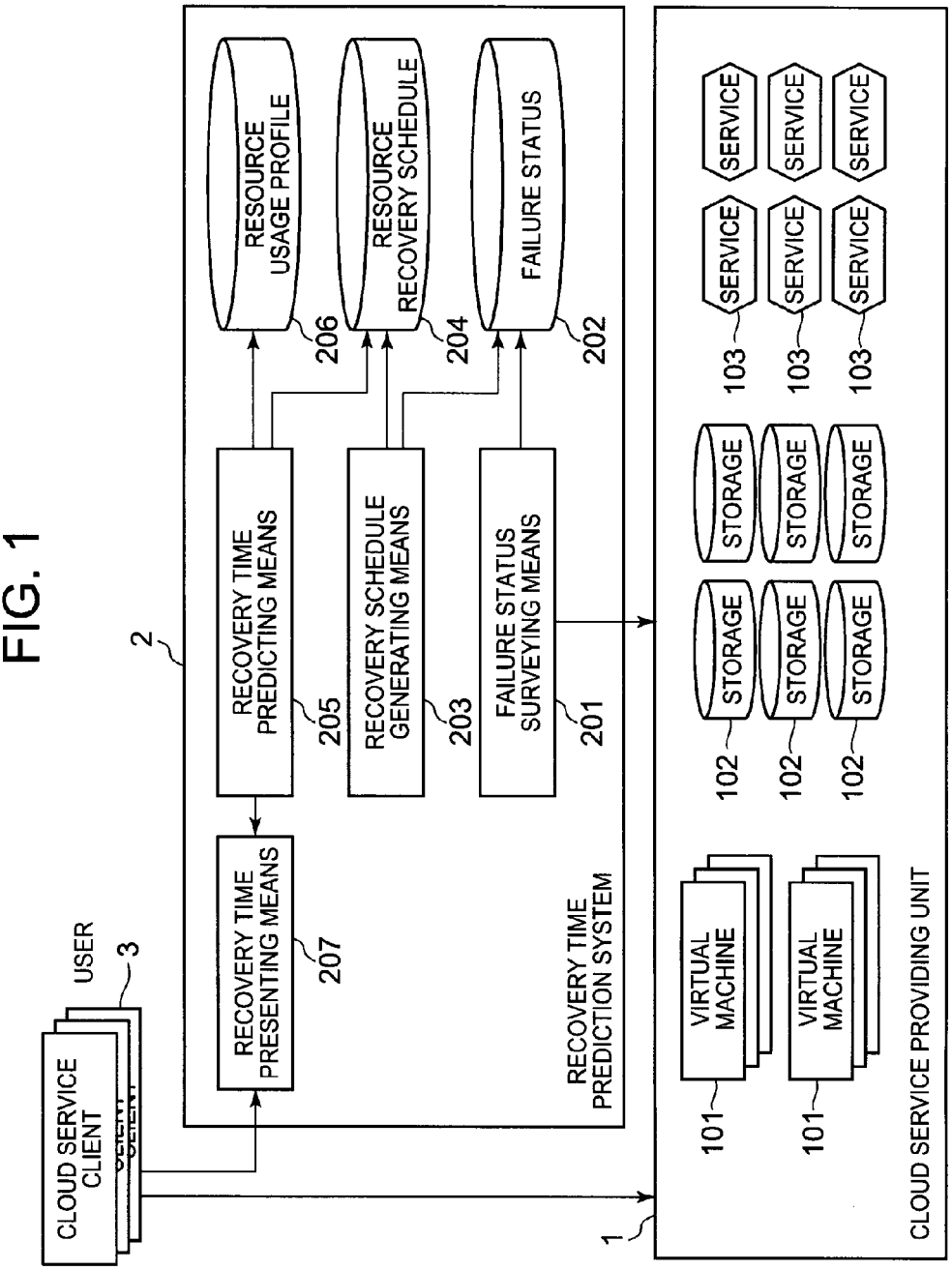
FIG. 1 It depicts an illustration diagram illustrating an example of an entire configuration of a cloud service.

FIG. 1 is an illustration diagram illustrating an example of an entire configuration of a cloud service including a cloud service recovery time prediction system according to a first exemplary embodiment of the invention. The cloud service illustrated in FIG. 1 includes a cloud service providing unit 1, a recovery time prediction system 2, and a cloud service client 3. The recovery time prediction system 2 illustrated in FIG. 1 corresponds to the cloud service recovery time prediction system according to the first exemplary embodiment of the invention. The cloud service providing unit 1, the recovery time prediction system 2, and the cloud service client 3 are connected to each other through a communication network (not illustrated).

The cloud service providing unit 1 includes a virtual machine 101, a storage 102, and a service providing unit 103. The virtual machine 101, the storage 102, and the service providing unit 103 are used to provide various services to a user. In the following description, the virtual machine 101 and the storage 102 included in the cloud service providing unit 1 will also be referred to as computing resources.

Also, the example illustrated in FIG. 1 illustrates the case where the cloud service providing unit 1 includes six virtual machines 101, six storages 102, and six service providing units 103. However, the number of virtual machines 101, the number of storages 102, and the number of service providing units 103 are not limited to six. The number of virtual machines 101, the number of storages 102, and the number of service providing units 103 may be one, two to five, or seven or more. Also, the number of virtual machines 101, the number of storages 102, and the number of service providing units 103 may be different from each other. Also, the cloud service providing unit 1 may include other similar computing resources in order to provide various services to a user.

Also, the cloud service providing unit 1 includes a dedicated interface (not illustrated) for providing computing resources such as the virtual machine 101 and the storage 102 to the user. Examples of the dedicated interface may include an interface for generating and deleting the virtual machine 101, and an interface for adding a storage.

The user of the cloud service uses a function of the cloud service client 3 to access the dedicated interface and use the virtual machine 101 and the storage 102 included in the cloud service.

The service providing unit 103 provides a service available to the user, in addition to the computing resources. Examples of the service provided by the service providing unit 103 may include a virtual private network (VPN) service for providing a private network access, a load balancer service for distributing a traffic load, a monitoring service for monitoring the state and performance of a specific virtual machine included in the cloud service, a scale-up service for increasing/decreasing the instance number of virtual machines in accordance with an increase/decrease in traffic, and an authentication service for restricting an access to resources.

The user of the cloud service uses a function of the cloud service client 3 to use the service provided by the service providing unit 103 and construct an application system (not illustrated) in the cloud service providing unit 1. The user of the cloud service registers the type and amount of a computing resource used and a service used in the cloud service, and pays a usage fee to a service provider according to a usage status. A cloud service provider stores information about computing resources used by each user and information about services used, in a resource usage profile storing unit 206 that will be described later.

The recovery time prediction system 2 includes a failure status surveying means 201, a failure status storing unit 202, a recovery schedule generating means 203, a resource recovery schedule storing unit 204, a recovery time predicting means 205, a resource usage profile storing unit 206, and a recovery time presenting means 207.

The failure status surveying means 201 surveys a computing resource inside the cloud service providing unit 1 and a failure status of the service providing unit 103. Specifically, the failure status surveying means 201 surveys each computing resource and a service failure status in the event of a cloud service failure accompanied with the loss of a plurality of types of computing resources. The failure status surveying means 201 stores the survey result in the failure status storing unit 202.

The failure status storing unit 202 stores a failure status inside the cloud service providing unit 1. The failure status surveying means 201 stores the failure status in the failure status storing unit 202 as needed.

The recovery schedule generating means 203 generates a recovery schedule for each computing resource and application service according to the failure status stored in the failure status storing unit 202. The recovery schedule generating means 203 stores the generated recovery schedule in the resource recovery schedule storing unit 204.

Herein, the recovery schedule is a schedule for, when a failure occurs in a plurality of types of computing resources provided by the cloud service providing unit 1 or in a service provided by the service providing unit 3 (hereinafter referred to as an application service), recovering the computing resources or the application service.

The recovery schedule is created by using a generally-known method. For example, the time taken to recover each computing resource failure, and the recovery order of each combination of failures may be preset. In this case, at the timing of registration of a failure status in the failure status storing unit 202, the recovery schedule generating means 203 may specify a computing resource failure from the failure status, and may generate a recovery schedule from a preset recovery time and recovery order based on a specified computing resource. Also, for example, when creating a storage recovery schedule, the recovery schedule generating means 203 may generate a recovery schedule by using the method described in Patent Literature 5.

However, a recovery schedule generating method of the recovery schedule generating means 203 is not limited to the above method. For example, when a recovery order of each computing resource and application service created by a manager or the like according to a failure status is input through an input means (not illustrated), the recovery schedule generating means 203 may use the input recovery order as a recovery schedule.

The resource recovery schedule storing unit 204 stores a recovery schedule with respect to each computing resource type and each application service.

The resource usage profile storing unit 206 stores a resource usage profile specifying computing resources (specifically, the type and amount of a computing resource) used by each user of the cloud service. The resource usage profile is pre-stored in the resource usage profile storing unit 206 by a manager or the like. Herein, the amount of a computing resource includes the number of virtual machines 101 and a capacity allocated from the storage 102.

The recovery time predicting means 205 predicts a service recovery time for each user based on the recovery schedule for each computing resource or application service and the resource usage profile stored in the resource usage profile storing unit 206. Specifically, the recovery time predicting means 205 identifies computing resources and application services used by the user from the resource usage profile. The recovery time predicting means 205 predicts the time, at which all the computing resources and the application services based on the recovery schedule.

The recovery time predicting means 205 may decide the recovery time of the cloud service used by the user by the latest time among the predicted recovery times of individual computing resources and application services as the recovery time.

The recovery time presenting means 207 presents the predicted service recovery time to the user. Examples of the service recovery time presenting method may include announcement on a Web site, and notification to the user using e-mail or an instant message. Also, presenting the recovery time also includes transmitting the recovery time indirectly to other devices.

The failure status surveying means 201, the recovery schedule generating means 203, the recovery time predicting means 205, and the recovery time presenting means 207 are executed by a CPU of a computer that operates according to a program (cloud service recovery time prediction program). For example, the program may be stored in a storage unit (not illustrated) inside the recovery time prediction system, and the CPU may operate as the failure status surveying means 201, the recovery schedule generating means 203, the recovery time predicting means 205, and the recovery time presenting means 207 according to the program read from the storage unit. Also, the failure status surveying means 201, the recovery schedule generating means 203, the recovery time predicting means 205, and the recovery time presenting means 207 may be implemented by dedicated hardware.

Also, the failure status storing unit 202, the resource recovery schedule storing unit 204, and the resource usage profile storing unit 206 may be implemented, for example, by a magnetic disk and the like.

Next, an operation of the recovery time prediction system 2 according to the first exemplary embodiment will be described. When a disaster or a power outage occurs in a data center operating a cloud service, failures may occur in a plurality of computing resources and an application service according to the degree of the disaster or the outage. For example, when a power outage occurs in one block of the data center, servers operating in the block and virtual machines operating in the servers stop. Also, in this case, storage devices inside the block and various application services also stop. Due to this failure, the users using the virtual machines, the storage devices and the application services cannot use the cloud service. When detecting the occurrence of a failure, the cloud service provider starts a recovery process of the cloud service. The recovery time prediction system 2 predicts a recovery time for each user affected by the failure, in the process of the cloud service recovery.

Figure 2:
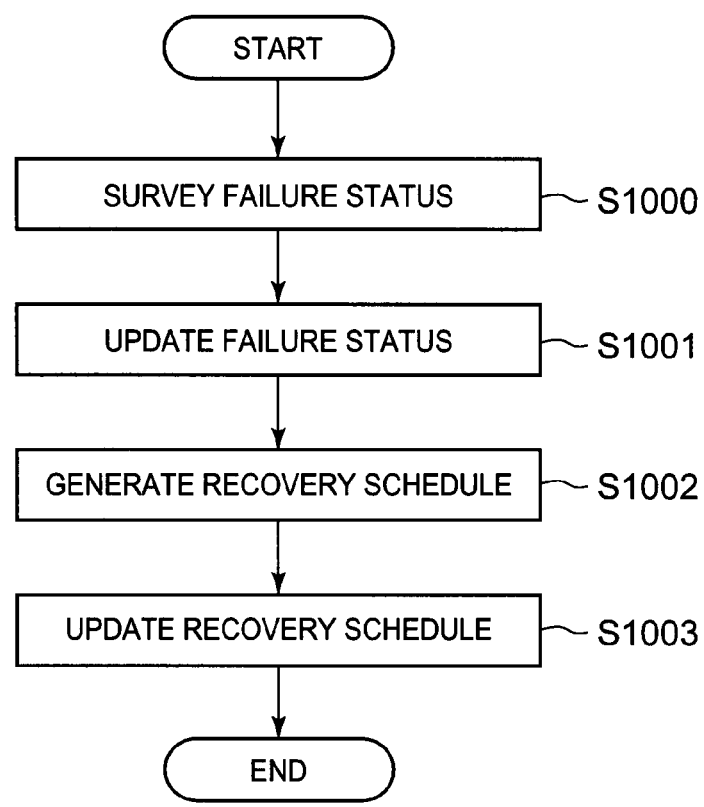
FIG. 2 It depicts a flowchart illustrating an example of processing for generating a recovery schedule.

FIG. 2 is a flowchart illustrating an example of processing for generating a recovery schedule by surveying a failure status of each computing resource or application service. First, in the recovery time prediction system 2, the failure status surveying means 201 specifies a physical server, a virtual server, a storage device, and various services downed in the cloud service providing unit 1 due to a failure, and surveys a damage status (step S1000). Examples of the damage status of each computing resource may include a state of requiring replacement due to a physical damage, a state of having logical inconsistency although there is no physical damage, a state of having the loss of some data, and a state of being unable to provide some functions in a service.

The failure status surveying means 201 stores the survey result in the failure status storing unit 202 (step S1001). The failure status surveying means 201 may automatically summarize the survey result, for example, by consolidating alert messages generated by the failure. Also, an administrator of cloud service may survey the failure status by checking a damage status of the actual spot or log data. Also, the failure status surveying means 201 may determine that a failure by the time of anomaly detection, by periodically monitoring the status of computing resources and application services. By repeated monitoring during a recovery process, the failure status storing unit 202 stores the latest failure status at each time point.

Next, the recovery schedule generating means 203 generates a recovery schedule for each computing resource or application service according to failure status (step S1002). Then, the recovery schedule generating means 203 updates the recovery schedule of the resource recovery schedule storing unit 204 (step S1003).

The recovery order (recovery schedule) differs according to the resource types, the damage statuses, the human resources necessary for recovery, and the reservation status of resources. The recovery schedule generating means 203 may create a recovery schedule based on the prepared information about expected recovery times and necessary recovery operations for different failure scenarios.

Also, when a recovery schedule for each resource type or application service created by an administrator is input, the recovery schedule generating means 203 may store the input recovery schedule in the resource recovery schedule storing unit 204. For example, a recovery schedule of virtual machine resources is created by an expert administration group that manages a server cluster hosting virtual machines. Likewise, a recovery schedule of a storage is generated by an expert administration group for storage management. The recovery schedule generating means 203 may replace the generated recovery schedule with the recovery schedule created by the administrators.

Figure 3:
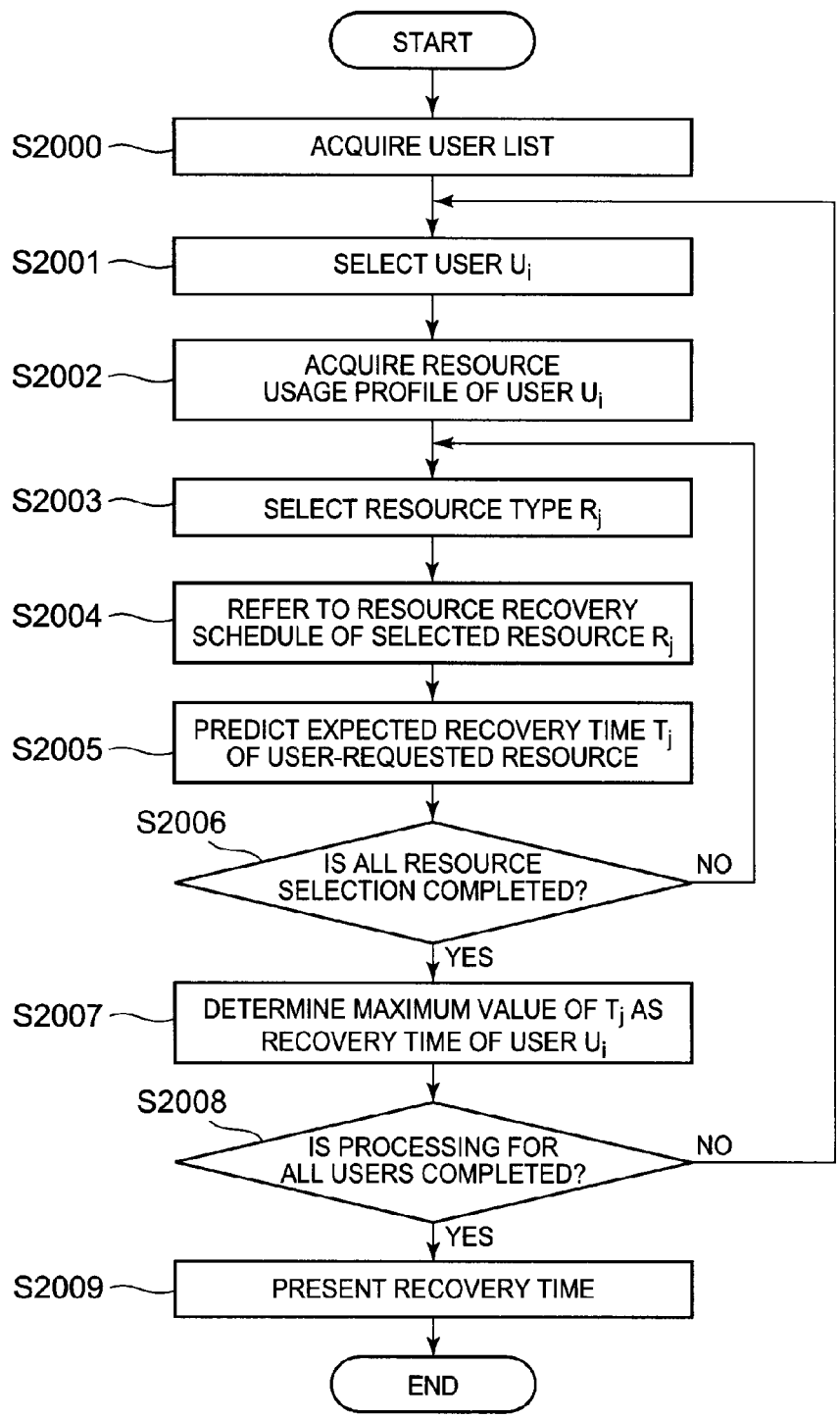
FIG. 3 It depicts a flowchart illustrating an example of a procedure for predicting and presenting a service recovery time with respect to each user.

FIG. 3 is a flowchart illustrating an example of a procedure for predicting and presenting a service recovery time with respect to each user based on a recovery schedule and a resource usage profile. First, the recovery time predicting means 205 acquires a list of all users of the cloud service from the resource usage profile storing unit 206 (step S2000). Also, the recovery time predicting means 205 may acquire a list of users affected by a failure. The recovery time predicting means 205 selects users from the acquired user list one by one (step S2001), and surveys a recovery prediction time. Specifically, the recovery time predicting means 205 acquires a resource usage profile of a selected user Ui with reference to the resource usage profile storing unit 206 (step S2002).

The resource usage profile includes a list of computing resources requested by the user, and a resource type (hereinafter referred to as a resource type Rj) is specified from the resource list. Thus, the recovery time predicting means 205 selects a resource type Rj from the resource usage profile (step S2003). For example, a resource type Rj may represent a virtual machine, a storage, and an application service. Also, the resource type Rj may represent information indicating whether a certain computing resource is shared resource or not.

Next, the recovery time predicting means 205 refers to the resource recovery schedule storing unit 204 and refers to a resource recovery schedule of the selected resource type Rj (step S2004). The resource recovery schedule specifies the amount or the portion of resource to be recovered at each time point from the start of recovery process. Thus, the recovery time predicting means 205 predicts an expected recovery time Tj at which a resource requested by the user described in the resource usage profile is available by recovery (step S2005). Also, the recovery time predicting means 205 may record the prediction result in a memory (not illustrated) or the like.

The recovery time predicting means 205 checks whether an expected recovery time Tj for all resource types Rj described in the resource usage profile has been predicted (step S2006). When the expected recovery time Tj for all resource types Rj has not been predicted (NO in step S2006), the recovery time predicting means 205 repeats the processing from step S2003 to step S2006.

On the other hand, when the expected recovery time Tj for all resource types Rj has been predicted (YES in step S2006), the recovery time predicting means 205 obtains a maximum value of the expected recovery time Tj. The recovery time predicting means 205 determines the maximum value of the expected recovery time Tj as an expected recovery time of the service for user Ui (step S2007). Also, the recovery time predicting means 205 may record the expected recovery time in a memory (not illustrated) or the like.

The recovery time predicting means 205 checks whether a recovery schedule time for all users included in the user list has been predicted (step S2008). When the expected recovery times for all the users has not been predicted (NO in step S2008), the recovery time predicting means 205 repeats the processing from step S2001 to step S2008. On the other hand, when the expected recovery time for all users has been predicted (YES in step S2008), the recovery time predicting means 207 presents the expected recovery time to the user (step S2009).

As described above, according to the first exemplary embodiment, the recovery time predicting means 205 identifies computing resources and application services used by a user of the cloud service, from the resource usage profile.

Also, the recovery time predicting means 205 predicts a recovery time of all identified computing resources and the application services based on the recovery schedule. Accordingly, the recovery time predicting means 205 predicts a recovery time of the part of cloud service for the user. The recovery time presenting means 207 presents the predicted service recovery time to the user. Therefore, a cloud service recovery time can be predicted with respect to each user when a user-requested service is unavailable due to a failure of a cloud service provided by using a plurality of types of computing resources.

That is, in the first exemplary embodiment, the recovery time predicting means 205 predicts a service recovery time for each user with reference to the resource usage profile of the user and the recovery schedule of each computing resource or application service. Therefore, a service recovery time differing from user to user can be presented when a failure occurs in the cloud service.

Also, the failure status surveying means 201 may survey a failure status of each computing resource or application service and store the failure status in the failure status storing unit 202. The recovery schedule generating means 203 may generate a recovery schedule based on the failure status stored in the failure status storing unit 202, and store the recovery schedule in the resource recovery schedule storing unit 204. Thus, it is possible to more quickly respond to the failure by automatically creating the recovery schedule at the event of failure occurrence.

Exemplary Embodiment 2

Figure 4:
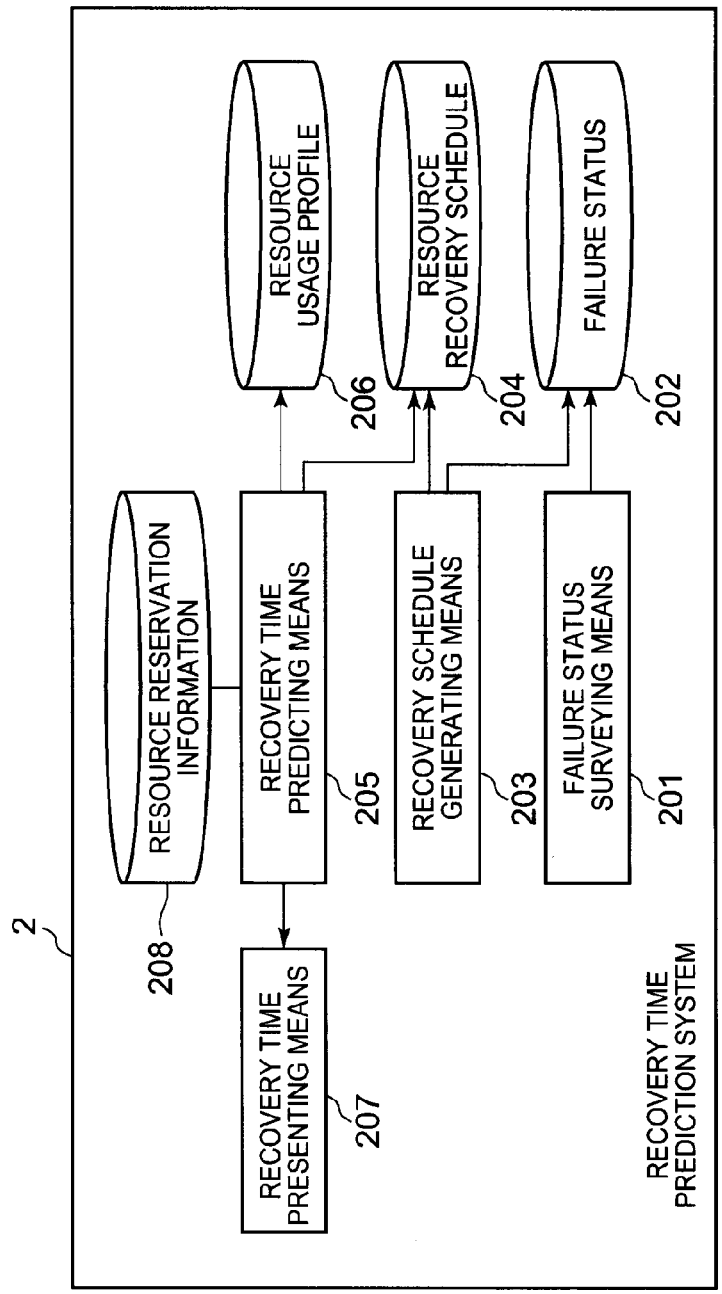
FIG. 4 It depicts an illustration diagram illustrating an example of a cloud service recovery time prediction system according to a second exemplary embodiment of the invention.

Next, a cloud service recovery time prediction system according to a second exemplary embodiment of the invention will be described. Also, the cloud service recovery time prediction system according to the second exemplary embodiment is also included in the same configuration as the cloud service illustrated in FIG. 1. FIG. 4 is an illustration diagram illustrating an example of the cloud service recovery time prediction system according to the second exemplary embodiment of the invention. In addition, the same configurations as in the first exemplary embodiment will be denoted by the same reference numerals as in FIG. 1, and a description thereof will be omitted. A recovery time prediction system 2 according to the second exemplary embodiment includes a resource reservation information storing unit 208 in addition to the configuration of the recovery time prediction system 2 according to the first exemplary embodiment.

Among the computing resources of a cloud service providing unit 1, some are shared by a plurality of users, and others are exclusively used between users. Examples of the resource type may include a shared virtual machine that can be used by any user. The exclusively-shared computing resource cannot be used simultaneously by all users. Therefore, a reservation function for allowing the use only to a specific user is required. The recovery time prediction system 2 according to the second exemplary embodiment predicts a recovery time with reference to reservation information used in order to implement the reservation function.

The resource reservation information storing unit 208 stores reservation information related to the use of each computing resource. The reservation information is information that includes a reservation start time of a computing resource shared by and exclusively used between a plurality of users in association with the user of the computing resource. The resource reservation information storing unit 208 is implemented, for example, by a magnetic disk. That is, the reservation information includes information representing the time (reservation start time) at which the user starts reservation of a computing resource.

A recovery time predicting means 205 specifies a computing resource or application service used by a user, from a resource usage profile of the user. Based on the reservation information, the recovery time predicting means 205 determines whether a computing resource used exclusively by a plurality of users is free. Based on the recovery schedule, the recovery time predicting means 205 stores reservation information, which includes a recovery time of the free computing resource as a reservation start time, in the resource reservation information storing unit 208. The recovery time predicting means 205 specifies the time at which the user can reserve a computing resource, from the recovery schedule and the reservation information.

Specifically, the recovery time predicting means 205 specifies a computing resource or application service, which is assumed to be most quickly recovered among the computing resources or application services used by the user, and a recovery time thereof, from the recovery schedule. Also, the recovery time predicting means 205 refers to the reservation information of a computing resource or application service corresponding to a specific time point. When the computing resource or application service is free, the recovery time predicting means 205 registers reservation information, which includes the recovery time as a reservation start time, in the resource reservation information storing unit 208. On the other hand, when the computing resource or application service is not free, the recovery time predicting means 205 repeats the above processing with respect to a computing resource or application service that is second-most quickly recovered. The recovery time predicting means 205 may determine whether a computing resource or application service is reservable, based on whether reservation information of a target computing resource has been registered.

The recovery time predicting means 205 predicts a recovery time of a part of cloud service used by the user, based on the recovery schedule and the reservation information. Specifically, the recovery time predicting means 205 may predict the latest time among the predicted recovery time of each computing resource or application service and the reservation time of each computing resource or application service used by the user as the recovery time of a part of cloud service used by the user. That is, the recovery time predicting means 205 predicts a service recovery time with assuming that the reserved computing resource or application service is recovered at the reservation start time included in the reservation information.

Figure 5:
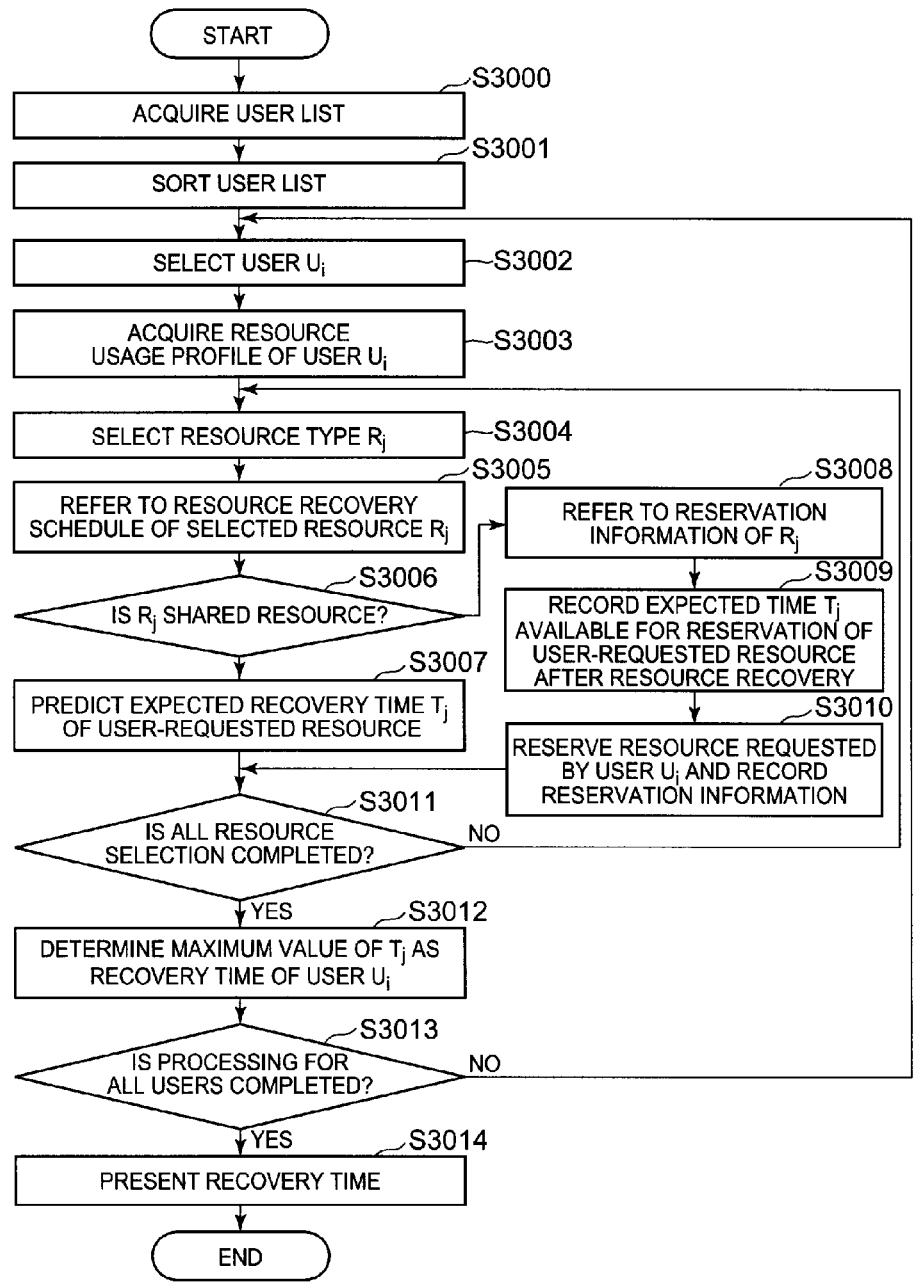
FIG. 5 It depicts a flowchart illustrating another example of a procedure for predicting and presenting a service recovery time with respect to each user.

Next, an operation of the recovery time prediction system according to the second exemplary embodiment will be described. FIG. 5 is a flowchart illustrating another example of a procedure for predicting and presenting a service recovery time with respect to each user.

First, the recovery time predicting means 205 acquires a list of all users of the cloud service from the resource usage profile storing unit 206 (step S3000). The recovery time predicting means 205 sorts a list of users according to priority in order to perform resource reservation and recovery time prediction for the users in descending order of priority (step S3001). The priority of users is determined according to the service contract type of the users, the use frequency, and the period. The recovery time predicting means 205 selects a user Ui having the highest priority from the sorted user list (step S3002), and acquires a resource usage profile of the user Ui (step S3003).

Next, the recovery time predicting means 205 selects a resource type Rj from the resource usage profile (step S3004). Then, the recovery time predicting means 205 refers to the resource recovery schedule storing unit 204 and refers to a resource recovery schedule of the selected resource type Rj (step S3005). The recovery time predicting means 205 determines whether the resource type Rj is a shared resource (step S3006).

When the resource type Rj is not a shared resource (NO in step S3006), the recovery time predicting means 205 predicts an expected recovery time Tj at which a resource requested by the user is available by recovery, with reference to the resource recovery schedule corresponding to the resource type Rj. Also, the recovery time predicting means 205 may record the prediction result in a memory (not illustrated) or the like (step S3007).

The case where the resource type Rj is not a shared resource is, for example, the case where the resource type Rj is a dedicated resource of the user Ui, or the case where the resource type Rj is a shared resource that does not require exclusive control. Specifically, a storage volume recording user data corresponds to the resource type Rj. Also, services such as a monitoring function shared and used by a plurality of users, and a load balancer function correspond to the resource type Rj.

On the other hand, when the resource type Rj is a shared resource (YES in step S3006), the recovery time predicting means 205 acquires reservation information of the resource type Rj with reference to the resource reservation information storing unit 208 (step S3008). The case where the resource type Rj is a shared resource is, for example, the case where the resource type Rj is a resource type that is shared and exclusively used by a plurality of users.

Next, with reference to the resource recovery schedule of the resource type Rj, the recovery time predicting means 205 predicts the shortest time, in which a user-requested resource can be reserved after resource recovery, as an expected recovery time Tj. This is because it is predicted that the recovered resource can be used at the time point available for reservation of a user-requested resource. At this time, the recovery time predicting means 205 determines that a resource reserved for use by other users is not free. Also, the recovery time predicting means 205 may record the prediction result in a memory (not illustrated) or the like (step S3009).

The recovery time predicting means 205 creates reservation information according to the type and amount of a resource requested by the user Ui, and stores the reservation information in the resource reservation information storing unit 208 (step S3010). The recovery time predicting means 205 may reserve a computing resource corresponding to the user Ui, for example, by storing the user Ui in association with the requested computing resource.

The recovery time predicting means 205 determines whether the expected recovery times Tj for all resource types Rj described in the resource usage profile have been predicted (step S3011). When the expected recovery times Tj for all resource types Rj have not been predicted (NO in step S3011), the recovery time predicting means 205 repeats the processing from step S3004 to step S3011.

On the other hand, when the expected recovery times Tj for all resource types Rj have been predicted (YES in step S3011), the recovery time predicting means 205 obtains a maximum value of the recovery schedule time Tj. The recovery time predicting means 205 determines the maximum value of the expected recovery time Tj as the expected recovery time of the user Ui (step S3012). Also, the recovery time predicting means 205 may record the expected recovery schedule time in a memory (not illustrated) or the like.

The recovery time predicting means 205 determines whether the expected recovery times for all users included in the user list have been predicted (step S3013). When the expected recovery time for all users have not been predicted (NO in step S3013), the recovery time predicting means 205 repeats the processing from step S3002 to step S3013.

On the other hand, when the expected recovery times for all users have been predicted (YES in step S3013), the recovery time presenting means 207 presents the predicted recovery time to the user (step S2009). That is, when the recovery time predicting means 205 sequentially predicts the recovery times of the computing resources used by the user based on the sorted user list and completes the recovery time prediction with respect to all users, the recovery time presenting means 207 presents the prediction result to each user.

As described above, according to the second exemplary embodiment, the recovery time predicting means 205 stores the reservation information in the resource reservation information storing unit 208. Specifically, based on the reservation information stored in the resource reservation information storing unit 208, the recovery time predicting means 205 determines whether a computing resource used by each user is free. Also, based on the recovery schedule, the recovery time predicting means 205 stores reservation information, which includes a recovery time of the free computing resource as a reservation start time, in the resource reservation information storing unit 208. The recovery time predicting means 205 predicts a recovery time of a part of cloud service used by the user, based on the recovery schedule and the reservation information.

That is, according to the second exemplary embodiment, the recovery time predicting means 205 records the reservation information of a recovered resource in the resource reservation information storing unit 208, with respect to a computing resource that is shared and exclusively used by a plurality of users. Therefore, the time when the type and amount of a resource requested by each user is completely available can be predicted as the service recovery time, and the prediction result can be presented to the user.

Specifically, according to the second exemplary embodiment, the recovery time predicting means 205 predicts the expected recovery time in consideration of the fact that a computing resource reserved by other users cannot be used even after its recovery. Therefore, it is possible to avoid the problem that the user cannot resume the use of the service because other users have first used the resource after the recovery.

Exemplary Embodiment 3

Figure 6:
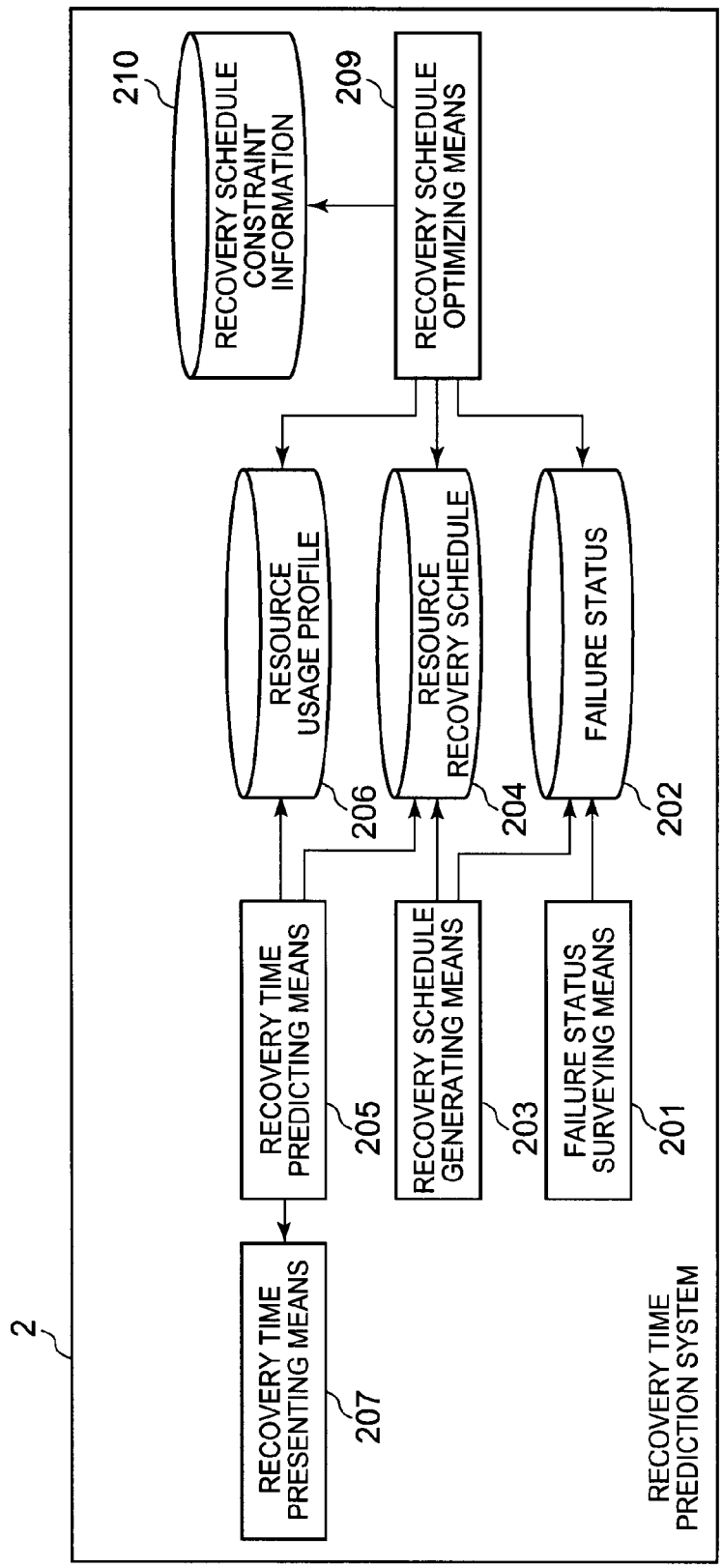
FIG. 6 It depicts an illustration diagram illustrating an example of a cloud service recovery time prediction system according to a third exemplary embodiment of the invention.

Next, a cloud service recovery time prediction system according to a third exemplary embodiment of the invention will be described. Also, the cloud service recovery time prediction system according to the third exemplary embodiment is also included in the same configuration as the cloud service illustrated in FIG. 1. FIG. 6 is an illustration diagram illustrating an example of the cloud service recovery time prediction system according to the third exemplary embodiment of the invention. In addition, the same configurations as in the first exemplary embodiment will be denoted by the same reference numerals as in FIG. 1, and a description thereof will be omitted. A recovery time prediction system 2 according to the third exemplary embodiment includes a recovery schedule optimizing means 209 and a recovery schedule constraint information storing unit 210 in addition to the configuration of the recovery time prediction system 2 according to the first exemplary embodiment.

The recovery schedule constraint information storing unit 210 stores constraint information and a request for a resource recovery schedule. Specifically, the recovery schedule constraint information storing unit 210 stores recovery schedule constraint information specifying a constraint condition of a resource recovery schedule based on a dependency relation between computing resources or a resource recovery request of a user. Examples of the recovery schedule constraint information may include the priority and the deadline of a recovery time of each user. The recovery schedule constraint information is pre-stored in the recovery schedule constraint information storing unit 210 by an administrator or the like.

Based on the recovery schedule constraint information, the recovery schedule optimizing means 209 generates a recovery schedule optimizing the recovery schedule of each computing resource or service. In generating the resource recovery schedule, the recovery schedule optimizing means 209 refers to the information stored in the resource usage profile storing unit 206 and the resource recovery schedule storing unit 204, together with the recovery schedule constraint information.

Specifically, the recovery schedule optimizing means 209 searches a recovery schedule candidate (combination) maximizing or minimizing a targeting index (hereinafter also referred to as a target index) under a constraint represented by the recovery schedule constraint information.

Whether to maximize or minimize the target index depends on the property of the target index. For example, when the target index is "the number of service recovery users within a predetermined period", the recovery schedule may be optimized by maximizing a value of the target index. Also, for example, when the target index is "recovery time", the recovery schedule may be optimized by minimizing a value of the target index.

The recovery schedule optimizing means 209 updates a corresponding recovery schedule stored in the resource recovery schedule storing means 204 by the searched recovery schedule. Then, the recovery time predicting means 205 predicts a recovery time of the service used by the user, based on the updated recovery schedule.

Examples of the targeting index may include the average recovery time of all users, the worst value of a recovery time of a specific user group, and the cost of a service provider taken for recovery. The targeting index is predetermined by an administrator or the like based on the input from the service provider or preset information.

An example of processing for optimizing the recovery schedule by the recovery schedule optimizing means 209 is illustrated. The recovery schedule optimizing means 209 specifies a computing resource used by the user, based on the resource usage profile. The recovery schedule optimizing means 209 specifies a recovery schedule (recovery order) of a specific computing resource based on the recovery schedule. For example, the recovery schedule optimizing means 209 determines a combination, which is obtained by changing the recovery order of computing resources in the recovery schedule, as a recovery schedule candidate. The recovery schedule optimizing means 209 determines whether the recovery schedule candidate satisfies a constraint represented by the recovery schedule constraint information. When a plurality of recovery schedule candidates are present, the recovery schedule optimizing means 209 selects an optimal candidate among the candidates, and updates the recovery schedule by the selected candidate.

The recovery schedule optimizing means 209 optimizes the recovery schedule according to the need of the service provider after the completion of the survey of a failure status, after the generation of each resource recovery schedule, or during the failure recovery processing.

The failure status surveying means 201, the recovery schedule generating means 203, the recovery time predicting means 205, the recovery time presenting means 207, and the recovery schedule optimizing means 209 are executed on a CPU of a computer that operates according to a program (cloud service recovery time prediction program). Also, the failure status surveying means 201, the recovery schedule generating means 203, the recovery time predicting means 205, the recovery time presenting means 207, and the recovery schedule optimizing means 209 may be implemented by dedicated hardware.

Figure 7:
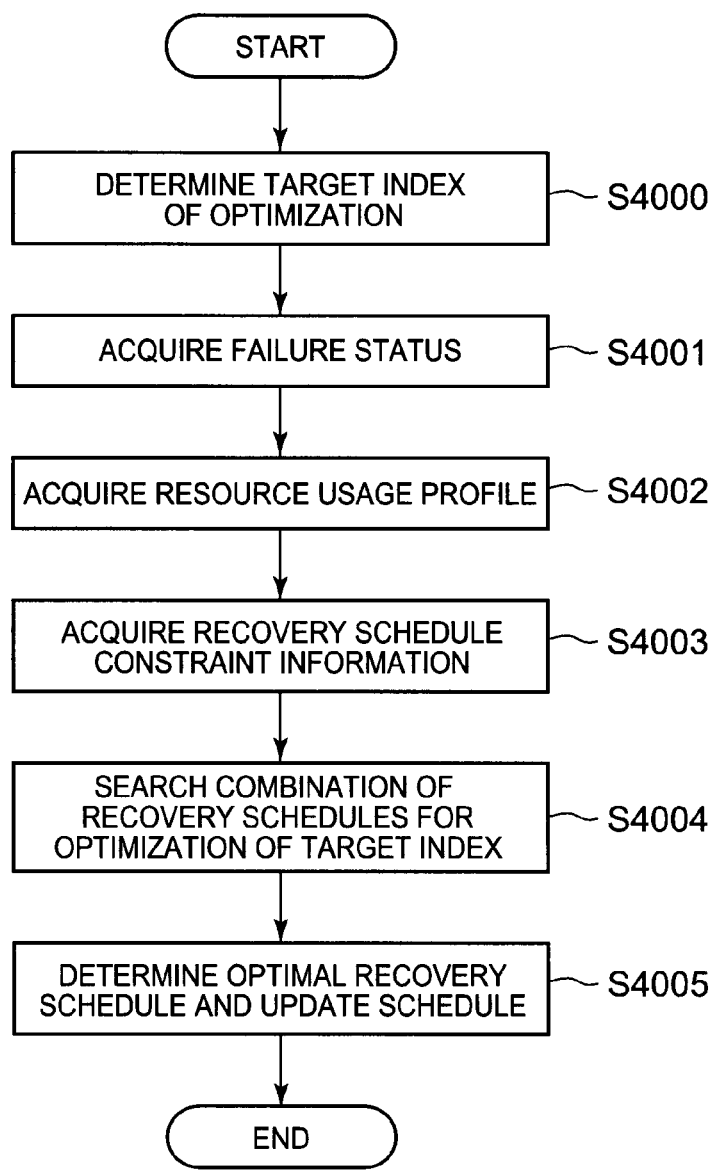
FIG. 7 It depicts a flowchart illustrating an example of processing for generating a recovery schedule.

Next, an operation of the recovery schedule optimizing means 209 for generating a recovery schedule according to the third exemplary embodiment will be described. FIG. 7 is a flowchart illustrating an example of processing for generating a recovery schedule.

The recovery schedule optimizing means 209 determines a target index of optimization based on the input from the service provider or the preset information (step S4000). Herein, the average recovery time of all users is determined as the target index. A method of determining a recovery schedule minimizing the average recovery time is described as an example of the optimization method.

The recovery schedule generating means 203 generates a recovery schedule for each computing resource and application service with reference to the failure status (step S4001). Also, the recovery schedule may be created by an administrator or the like. Thereafter, the recovery schedule generating means 203 stores the generated recovery schedule in the resource recovery schedule storing unit 204.

Next, the recovery schedule optimizing means 209 acquires information necessary for generation of a recovery schedule from the resource usage profile storing unit 206 and the recovery schedule constraint information storing unit 210. Specifically, the recovery schedule optimizing means 209 acquires a resource usage profile from the resource usage profile storing unit 206 (step S4002), and acquires recovery schedule constraint information from the recovery schedule constraint information storing unit 210 (step S4003).

The recovery schedule optimizing means 209 searches a feasible recovery schedule within a predetermined range of recovery schedule constraint information, and searches a recovery schedule combination optimizing the target index (step S4004). The recovery schedule optimizing means 209 searches the recovery schedule combination by using a generally-used method as a solution for the optimization problem. Herein, the case of using sequential search is described as an example of the simplest search method.

Figure 8:
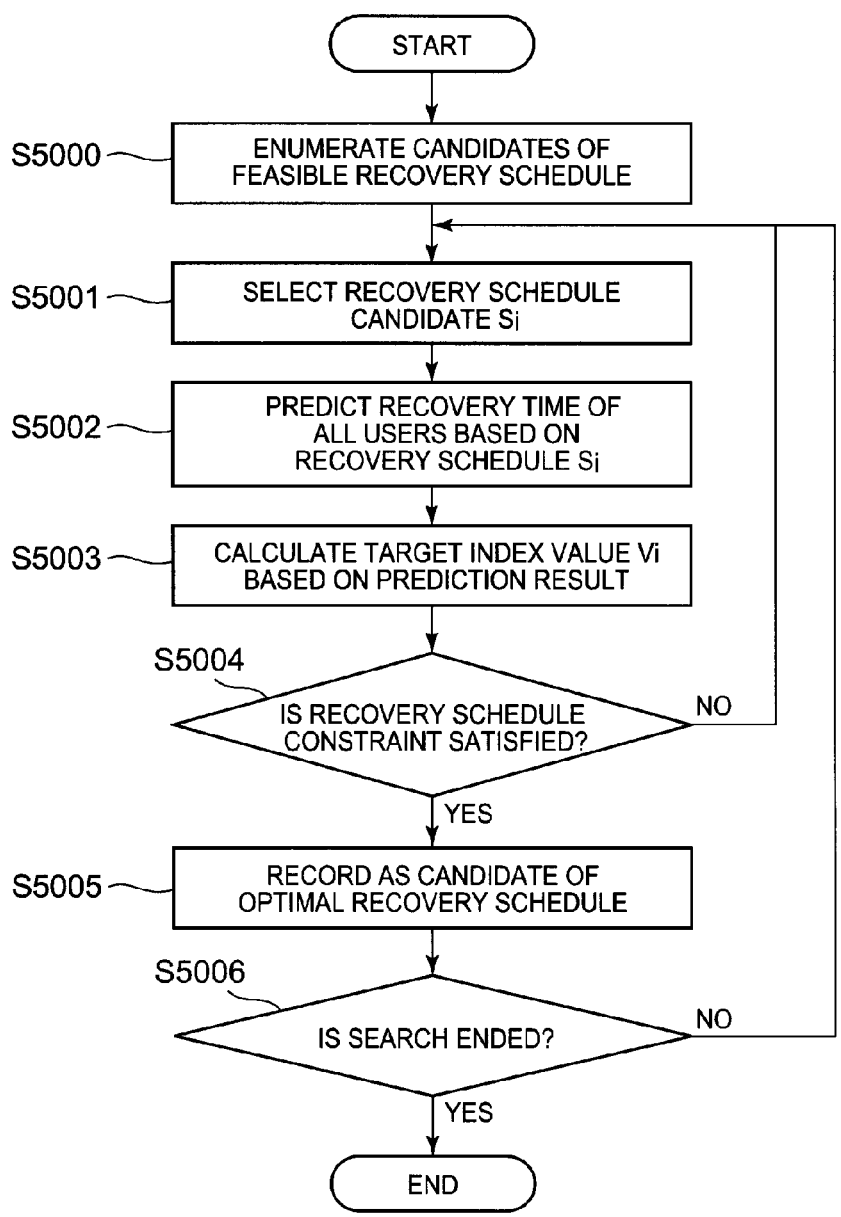
FIG. 8 It depicts a flowchart illustrating an example of sequential search processing.

FIG. 8 is a flowchart illustrating an example of sequential search processing. A recovery schedule of a computing resource is not limited to one. Various recovery schedules such as a combination, which is obtained by changing the recovery order of computing resources, may be used. First, the recovery schedule optimizing means 209 enumerates combination candidates of feasible recovery schedules based on the failure status (step S5000 in FIG. 8). Herein, the enumerated recovery schedule combination candidates are the search range (search space) for optimization.

The recovery schedule optimizing means 209 selects a recovery schedule candidate Sj (step S5001). Then, the recovery time predicting means 205 predicts a recovery time of all users (step S5002). Also, a method of predicting the service recovery time is the same as described in the first exemplary embodiment.

The recovery schedule optimizing means 209 calculates a target index value Vi based on prediction result (step S5003). Herein, the average recovery time is used as the target index. Then, the recovery schedule optimizing means 209 calculates an average value of the recovery times predicted for each user to calculate the target index value Vi.

Next, the recovery schedule optimizing means 209 determines whether the candidate Sj satisfies all recovery schedule constraint information stored in the recovery schedule constraint information storing unit 210 (step S5004).

For example, in the case of a constraint "a recovery time for a user group having high priority is within T (for example, $Vi \leq T$)", the recovery schedule optimizing means 209 determines whether the predicted recovery time satisfies the constraint.

When the candidate Sj satisfies all recovery schedule constraint information stored in the recovery schedule constraint information storing unit 210, the recovery schedule optimizing means 209 determines the candidate Sj as a recovery schedule candidate (hereinafter also referred to as an optimal recovery schedule candidate). Also, the recovery schedule optimizing means 209 may record the optimal recovery schedule candidate in a memory (not illustrated) or the like (step S5005).

The recovery schedule optimizing means 209 determines whether the search of a recovery schedule candidate is ended (step S5006). The recovery schedule optimizing means 209 may determine whether the search of a recovery schedule candidate is ended, for example, by determining whether a search end condition is satisfied. When the search of a recovery schedule candidate is not ended (NO in step S5006), the processing from step S5001 to step S5006 is repeated. On the other hand, when the search of a recovery schedule candidate is ended (YES in step S5006), the optimizing processing is ended.

That is, the processing from step S5001 to step S5005 is repeated with respect to a different Sj. Then, at the time of arrival at the search end condition, the search of a recovery schedule candidate is ended. Examples of the search end condition may include the case of searching all candidates, and the case of stopping at the end of a predetermined number of searches.

The recovery schedule optimizing means 209 determines an optimal recovery schedule among the recovery schedule candidates obtained as a result of the search, and updates the recovery schedule stored in the resource recovery schedule storing unit 204 (step S4005 in FIG. 7). Herein, the average recovery time is used as the target index. Thus, as a result of the search, the recovery schedule optimizing means 209 determines a recovery schedule having the minimum average recovery time among the recovery schedule candidates as an optimal recovery schedule.

As described above, according to the third exemplary embodiment, the recovery schedule optimizing means 209 searches a recovery schedule candidate maximizing or minimizing a targeting index under a constraint represented by the recovery schedule constraint information. Also, the recovery schedule optimizing means 209 updates a recovery schedule stored in the resource recovery schedule storing means 204 by the searched recovery schedule. Then, the recovery time predicting means 205 predicts a recovery time of a part of cloud service used by the user, based on the updated recovery schedule.

That is, according to the third exemplary embodiment, the recovery schedule optimizing means 209 updates the optimal resource recovery schedule, as necessary, based on the recovery schedule constraint information stored in the recovery schedule constraint information storing unit 210. Therefore, the recovery time satisfying the constraint or the request of the user for service recovery can be predicted.

First Example

Hereinafter, the invention will be described with reference to specific examples; however, the scope of the invention is not limited to the following description.

Figure 9:
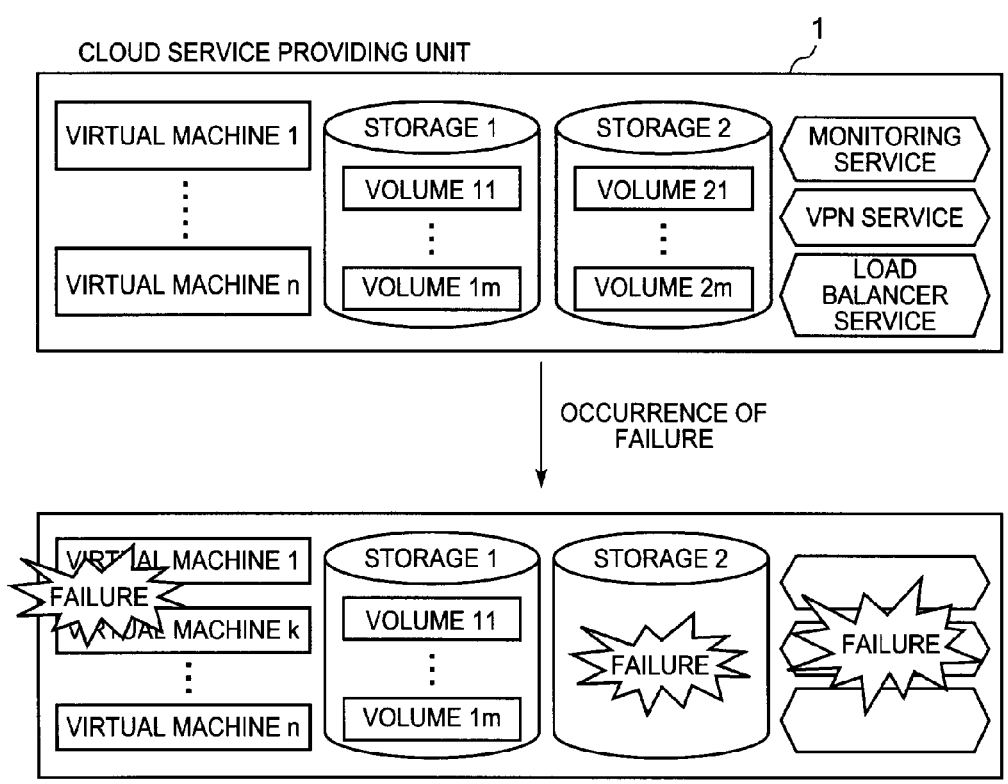
FIG. 9 It depicts an illustration diagram illustrating an example of a computing resource and a service provided by a cloud service according to a first example.

FIG. 9 is an illustration diagram illustrating an example of a computing resource and a service provided by the cloud service providing unit 1 according to the first example. The cloud service providing unit 1 according to the first example provides n virtual machines (virtual machines 1 to n), 2*m storage volumes (volumes 11 to 2m), a monitoring service, a VPN service, and a load balancer service to a user. Herein, n and m are positive numbers. Also, the service provided by the cloud service providing unit 1 may also be referred to as a supplementary service.

Herein, it is assumed that a site-scale failure occurs in the cloud service providing unit 1 and a failure occurs in a plurality of computing resources. It is assumed that, due to a site failure, k virtual machines (virtual machines 1 to k), m storage volumes (volumes 21 to 2m), and all supplementary services have stopped.

FIG. 10 is an illustration diagram illustrating a portion of a resource profile of a cloud service user. It is assumed that a resource profile of the cloud service user illustrated in FIG. 10 is stored in the resource usage profile storing unit 206 at the time of occurrence of a failure. The resource profile includes the number and types of virtual machines required by each user, storage regions, and supplementary services. In the example illustrated in FIG. 10, a user A uses one standard-type virtual machine and a volume 11 of the storage volume, and also uses a monitoring service.

According to the cloud service, virtual machines having different specs or functions may also be prepared. Therefore, a necessary virtual machine type may be included in the resource usage profile. However, for simplicity of description, in the first example, it is assumed that all virtual machines are standard-type virtual machines. Also, it is assumed that a virtual machine used by users A to F is affected by a failure.

First, the failure status surveying means 201 surveys a damage status of a computing resource caused by a failure, and records the surveyed failure status in the failure status storing unit 202. FIG. 11 is an illustration diagram illustrating an example of failure status data. The failure status data includes information representing a faulty portion of a computing resource used in the cloud service providing unit 1. Also, the failure status data includes information about a failure factor and a recovery procedure, as necessary. The failure status data are used to create a resource recovery schedule.

FIG. 12 is an illustration diagram illustrating an example of a resource recovery schedule. Herein, it is assumed that the resource recovery schedule is designed by a person in charge of planning a recovery operation, in consideration of the number of processes taken for a recovery operation and a damage status of a computing resource. The recovery schedule generating means 203 stores the created resource recovery schedule in the resource recovery schedule storing unit 204. Herein, each computing resource and a recovery schedule time of the supplementary service are stored in the resource recovery schedule storing unit 204.

For example, the virtual machine recovery schedule illustrated in FIG. 12 illustrates a schedule in which a recovery operation is started at 12:00, four standard-type virtual machines are available at 12:30, and four additional virtual machines are available at 13:00.

When a resource recovery schedule of all computing resources and the supplementary service is determined, the recovery time predicting means 205 predicts a service recovery time for each user with reference to the recovery schedule and the resource usage profile. Herein, it is assumed that the service recovery time is predicted according to the procedure of the flowchart illustrated in FIG. 3.

First, the recovery time predicting means 205 selects a user A, and refers to a resource usage profile of the user A. The fact that the user A uses a virtual machine, a storage, and a monitoring service can be determined from the resource usage profile illustrated in FIG. 10.

First, the recovery time predicting means 205 refers to a recovery schedule of the virtual machine. It is illustrated that four standard-type virtual machines can be used at 12:30 by the recovery schedule illustrated in FIG. 12. Therefore, the recovery time predicting means 205 predicts a recovery schedule time of the virtual machine used by the user A as 12:30.

Next, the recovery time predicting means 205 refers to a recovery schedule of the storage. From the recovery schedule illustrated in FIG. 12, it can be seen that the volume 21 used by the user A is scheduled to be recovered at 12:20. Therefore, the recovery time predicting means 205 predicts a recovery schedule time of the storage used by the user A as 12:20.

Likewise, the recovery time predicting means 205 refers to a recovery schedule of the monitoring service. From the recovery schedule illustrated in FIG. 12, it can be seen that the monitoring service is scheduled to be recovered at 12:30. Therefore, the recovery time predicting means 205 predicts a recovery schedule time of the monitoring service used by the user A as 12:30.

From the above result, the recovery time predicting means 205 obtains the maximum value among the recovery times of each computing resource or service. Herein, the recovery time predicting means 205 can determine that a service recovery schedule time for the user A is 12:30.

Likewise, with respect to other users, the recovery time predicting means 205 calculates a recovery schedule time of the service based on the resource usage profile of each user. FIG. 13 is an illustration diagram illustrating an example of the result of calculation of a service recovery schedule time with respect to each user.

Lastly, the recovery time presenting means 207 presents the predicted service recovery time to the user. The object of the invention can be achieved by performing such processing.

Second Example

In the first example, it is assumed that users A to F use a standard-type virtual machine. In the second example, it is assumed that the standard-type virtual machine is a type of resource that is shared and exclusively used by a plurality of users. That is, in the second example, recovery time prediction considering the reservation of a virtual machine is performed in order to perform more accurate recovery time prediction. By considering the reservation of a virtual machine, more accurate recovery time prediction can be performed. Also, the second example corresponds to the second exemplary embodiment.

FIG. 14 is an illustration diagram illustrating an example of virtual machine reservation information. Herein, it is assumed that the service recovery time is predicted according to the procedure of the flowchart illustrated in FIG. 5. Also, in the second example, it is assumed that reservation using a computing resource is performed in the order from the user A to the user F.

According to the recovery schedule illustrated in FIG. 12, four virtual machines are recovered at 12:30. The virtual machines can be used only by the user A, the user B and the user C. Also, according to the recovery schedule illustrated in FIG. 12, four virtual machines are further recovered at 13:00. The virtual machines are reserved only by the user C, the user D and the user E.

When a recovery time is predicted based on the reservation information, a recovery prediction time of the virtual machine varies. Therefore, the service recovery time predicted by the method of the second example is different from the service recovery time predicted by the method of the first example. FIG. 15 is an illustration diagram illustrating another example of the result of calculation of a service recovery time with respect to each user.

By comparing the service recovery time illustrated in FIG. 15 with the service recovery time illustrated in FIG. 13, it can be seen that the service recovery time of the user E and the user F varies. Thus, by performing recovery time prediction with reference to the reservation information, more accurate and definite recovery time can be presented to each user.

Next, an example of the minimum configuration of the invention will be described. FIG. 16 is a block diagram illustrating an example of the minimum configuration of a cloud service recovery time prediction system according to the invention. The cloud service recovery time prediction system according to the invention includes: a recovery schedule storing means 81 (for example, the resource recovery schedule storing unit 204) for storing a recovery schedule specifying a schedule for recovering a plurality of types of computing resources (for example, the virtual machine 101 and the storage 102) provided in a cloud service (for example, the cloud service providing unit 1) or an application service (for example, the service providing unit 103) that is a service provided in the cloud service when a failure occurs in the computing resources or the application service, with respect to each computing resource type or each application service; a resource usage profile storing means 82 (for example, the resource usage profile storing unit 206) for storing a resource usage profile specifying a computing resource used when each user uses the cloud service, with respect to each user; a recovery time predicting means 83 (for example, the recovery time predicting means 205) for specifying a computing resource or an application service used when a user uses the cloud service, from the resource usage profile, and predicting a time for recovering all specified computing resources or an application service, based on the recovery schedule, to predict a recovery time of the cloud service used by the user; and a recovery time presenting means 84 (for example, the recovery time presenting means 207) for presenting the predicted service recovery time to the user.

By this configuration, a cloud service recovery time can be predicted with respect to each user when a user-requested service is unavailable due to a failure of the cloud service provided by using a plurality of types of computing resources.

Some or all of the above exemplary embodiments can be described as the following supplementary notes, but are not limited thereto.

(Supplementary note 1) A cloud service recovery time prediction system including: a recovery schedule storing means for storing a recovery schedule specifying a schedule for recovering a plurality of types of computing resources provided in a cloud service or an application service that is a service provided in the cloud service when a failure occurs in the computing resources or the application service, with respect to each computing resource type or each application service; a resource usage profile storing means for storing a resource usage profile specifying a computing resource used when each user uses the cloud service, with respect to each user; a recovery time predicting means for identifying computing resources and application services used by a user of the cloud service, from the resource usage profile, and predicting a time for recovering all the identified computing resources and application services, based on the recovery schedule, to predict a recovery time of the cloud service used by the user; and a recovery time presenting means for presenting the predicted service recovery time to the user.

(Supplementary note 2) The cloud service recovery time prediction system according to Supplementary note 1, including: a failure status storing means for storing a failure status of each computing resource or application service; a failure status surveying means for surveying the failure status and storing the failure status in the failure status storing means; and a recovery schedule generating means for generating a recovery schedule based on the failure status stored in the failure status storing means, and storing the recovery schedule in the recovery schedule storing means.

(Supplementary note 3) The cloud service recovery time prediction system according to Supplementary note 1 or 2, including a resource reservation information registering means for storing reservation information, which includes a reservation start time of a computing resource shared by and exclusively used between a plurality of users in association with the user of the computing resource, in a resource reservation information storing means, wherein the resource reservation information registering means determines whether the computing resource used by each user is free, based on the reservation information stored in the resource reservation information storing means, and stores the reservation information, which includes a recovery time of the free computing resource as a reservation start time, in the resource reservation information storing means based on the recovery schedule, and the recovery time predicting means predicts the recovery time of the cloud service used by the user, based on the recovery schedule and the reservation information.

(Supplementary note 4) The cloud service recovery time prediction system according to any one of Supplementary notes 1 to 3, including: a recovery schedule constraint information storing means for storing recovery schedule constraint information specifying a constraint condition of a recovery schedule based on a dependency relation between computing resources or a resource recovery request of a user; and a recovery schedule optimizing means for searching a recovery schedule candidate maximizing or minimizing a targeting index under a constraint represented by the recovery schedule constraint information, and updating a corresponding recovery schedule stored in a resource recovery schedule storing means by the recovery schedule, wherein the recovery time predicting means predicts the recovery time of the cloud service used by the user, based on the updated recovery schedule.

(Supplementary note 5) A cloud service recovery time prediction method that predicts a recovery time when a failure occurs in a plurality of types of computing resources provided in a cloud service or in an application service that is a service provided in the cloud service, the cloud service recovery time prediction method including: identifying computing resources and application services used by the user of the cloud service, with reference to a resource usage profile storing means storing a resource usage profile specifying computing resources used by the user; extracting a recovery schedule from a recovery schedule storing means storing a recovery schedule specifying a schedule for recovering the computing resources or the application service with respect to each computing resource type or each application service when a failure occurs in the computing resources or the application service; predicting a recovery time of the cloud service used by the user by predicting a time for recovering all identified computing resources or an application service, based on the extracted recovery schedule; and presenting the predicted service recovery time to the user.

(Supplementary note 6) The cloud service recovery time prediction method according to Supplementary note 5, including: surveying a failure status of each computing resource or application service and storing the failure status in a failure status storing means; generating a recovery schedule based on the failure status stored in the failure status storing means; and storing the recovery schedule in the recovery schedule storing means.

(Supplementary note 7) The cloud service recovery time prediction method according to Supplementary note 5 or 6, including: when storing reservation information, which includes a reservation start time of a computing resource shared by and exclusively used between a plurality of users in association with the user of the computing resource, in a resource reservation information storing means, determining whether the computing resource used by each user is free, based on the reservation information stored in the resource reservation information storing means, and storing the reservation information, which includes a recovery time of the free computing resource as a reservation start time, in the resource reservation information storing means based on the recovery schedule; and predicting the recovery time of the cloud service used by the user, based on the recovery schedule and the reservation information stored in the resource reservation information storing means.

(Supplementary note 8) The cloud service recovery time prediction method according to any one of Supplementary notes 5 to 7, including: searching a recovery schedule candidate maximizing or minimizing a targeting index under a constraint represented by recovery schedule constraint information specifying a constraint condition of a recovery schedule based on a dependency relation between computing resources or a resource recovery request of a user; updating a corresponding recovery schedule stored in a resource recovery schedule storing means by the recovery schedule; and predicting the recovery time of the cloud service used by the user, based on the updated recovery schedule.

(Supplementary note 9) A cloud service recovery time prediction program applied to a computer that predicts a recovery time when a failure occurs in a plurality of types of computing resources provided in a cloud service or in an application service that is a service provided in the cloud service, the cloud service recovery time prediction program causing the computer to execute: a recovery time predicting process of specifying a computing resource and an application service used by a user of the cloud service, with reference to a resource usage profile storing means storing a resource usage profile specifying computing resources used by each user of the cloud service, from the resource usage profile stored in the resource usage profile storing means, extracting a recovery schedule from a recovery schedule storing means storing a recovery schedule specifying a schedule for recovering the computing resources or the application service with respect to each computing resource type or each application service when a failure occurs in the computing resources or the application service, and predicting a recovery time of the cloud service used by the user by predicting a time for recovering all identified computing resources or an application service, based on the extracted recovery schedule; and a recovery time presenting process of presenting the predicted service recovery time to the user.

(Supplementary note 10) The cloud service recovery time prediction program according to Supplementary Note 10, causing the computer to execute: a failure status surveying process of surveying a failure status of each computing resource or application service and storing the failure status in a failure status storing means; and a recovery schedule generating process of generating a recovery schedule based on the failure status stored in the failure status storing means, and storing the recovery schedule in the recovery schedule storing means.

(Supplementary note 11) The cloud service recovery time prediction program according to Supplementary note 9 or 10, causing the computer to execute: a resource reservation information registering process of, when storing reservation information, which includes a reservation start time of a computing resource shared by and exclusively used between a plurality of users in association with the user of the computing resource, in a resource reservation information storing means, determining whether the computing resource used by each user is free, based on the reservation information stored in the resource reservation information storing means, and storing the reservation information, which includes a recovery time of the free computing resource as a reservation start time, in the resource reservation information storing means based on the recovery schedule; and a recovery time predicting process of predicting the recovery time of the cloud service used by the user, based on the recovery schedule and the reservation information stored in the resource reservation information storing means.

(Supplementary note 12) The cloud service recovery time prediction program according to any one of Supplementary notes 9 to 11, causing the computer to execute: a recovery schedule optimizing process of searching a recovery schedule candidate maximizing or minimizing a targeting index under a constraint represented by recovery schedule constraint information specifying a constraint condition of a recovery schedule based on a dependency relation between computing resources or a resource recovery request of a user, and updating a recovery schedule stored in a resource recovery schedule storing means by the recovery schedule; and a recovery time predicting process of predicting the recovery time of the cloud service used by the user, based on the updated recovery schedule.

While the invention has been described above with reference to exemplary embodiments and embodiments, the invention is not limited to the exemplary embodiments and the embodiments. Those skilled in the art will understand that various changes may be made in the configurations and details of the invention within the scope of the invention.

This application claims the priority based on Japanese Patent Application No. 2011-196064 filed on Sep. 8, 2011, the entire disclosure of which is incorporated herein by reference.

INDUSTRIAL APPLICABILITY

The invention can be suitably applied to a cloud service recovery time prediction system that predicts a service recovery time with respect to each service user in the event of a system failure accompanied with a fault in a plurality of computing resources.

REFERENCE SIGNS LIST

1 Cloud service providing unit
101 Virtual machine
102 Storage
103 Service providing unit
2 Recovery time prediction system
201 Failure status surveying means
202 Failure status storing unit
203 Recovery schedule generating means
204 Resource recovery schedule storing unit
205 Recovery time predicting means
206 Resource usage profile storing unit
207 Recovery time presenting means
208 Resource reservation information storing unit
209 Recovery schedule optimizing means
210 Recovery schedule constraint information storing unit
3 Cloud service client

What is claimed is:

1. A cloud service recovery time prediction system, comprising:
    a recovery schedule storage configured to store a recovery schedule specifying a schedule for recovering at least one of:
        a plurality of types of computing resources provided in a cloud service, and
        an application service provided in the cloud service, when a failure occurs in the computing resources or the application service, with respect to each computing resource type or each application service,
    a resource usage profile storage configured to store a resource usage profile specifying computing resources used by a user of the cloud service, with respect to each user;
    a recovery time predictor configured to predict:
        a computing resource or an application service used by a user of the cloud service, from the resource usage profile,
        a time for recovering all the identified computing resources or an application service, based on the recovery schedule, and
        a recovery time of the cloud service used by the user; and
    a recovery time presenter configured to present the predicted service recovery time to the user,
    wherein the predicted service recovery time indicates an expected service recovery time at which the cloud service is predicted to be available to the user after the recovery of all the associated failed resources and application services; and
    wherein at least one of the recovery time predictor and the recovery time presenter is implemented using a hardware processor.

2. The cloud service recovery time prediction system according to claim 1, further comprising:
    a failure status storage configured to store a failure status of each computing resource or application service;
    a failure status surveyor configured to survey the failure status and store the failure status in the failure status storage; and
    a recovery schedule generator configured to generate a recovery schedule based on the failure status stored in the failure status storage, and to store the recovery schedule in the recovery schedule storage.

3. The cloud service recovery time prediction system according to claim 1, further comprising a resource reservation information register configured to store reservation information, which includes a reservation start time of a computing resource shared by and exclusively used between a plurality of users in association with the user of the computing resource, in a resource reservation information storage, wherein
    the resource reservation information register is further configured to determine whether the computing resource used by each user is free, based on the reservation information stored in the resource reservation information storage, and to store the reservation information, which includes a recovery time of the free computing resource as a reservation start time, in the resource reservation information storage based on the recovery schedule, and wherein
    the recovery time predictor is further configured to predict the recovery time of the cloud service used by the user, based on the recovery schedule and the reservation information.

4. The cloud service recovery time prediction system according to claim 1, further comprising:
    a recovery schedule constraint information storage configured to store recovery schedule constraint information specifying a constraint condition of a recovery schedule based on a dependency relation between computing resources or a resource recovery request of a user; and
    a recovery schedule optimizer configured to search for a recovery schedule candidate maximizing or minimizing a targeting index under a constraint represented by the recovery schedule constraint information, and updating a corresponding recovery schedule stored in a resource recovery schedule storage by the recovery schedule,
    wherein the recovery time predictor is further configured to predict the recovery time of the cloud service used by the user, based on the updated recovery schedule.

5. The cloud service recovery time prediction system according to claim 1, wherein the recovery time predictor is further configured to predict the recovery time of the cloud service used by the user by the latest time among the recovery times of individual computing resources and application services as the recovery time.

6. A cloud service recovery time prediction method that predicts a recovery time when a failure occurs in a plurality of types of computing resources provided in a cloud service or in an application service that is a service provided in the cloud service, the cloud service recovery time prediction method comprising:
    identifying computing resources and application services used by a user of the cloud service, with reference to a resource usage profile storing unit storing a resource usage profile specifying a computing resource used by each user of the cloud service with respect to each user, from the resource usage profile stored in the resource usage profile storing unit;
    extracting a recovery schedule from a recovery schedule storing unit storing a recovery schedule specifying a schedule for recovering the computing resources or the application service with respect to each computing resource type or each application service when a failure occurs in the computing resources or the application service;
    predicting a recovery time of the cloud service used by the user by predicting a time for recovering all specified computing resources or an application service, based on the extracted recovery schedule; and presenting the predicted service recovery time to the user, wherein the predicted service recovery time indicates an expected service recovery time at which the cloud service is predicted to be available to the user after the recovery of all the associated failed resources and application services.

7. The cloud service recovery time prediction method according to claim 6, comprising:

surveying a failure status of each computing resource or application service and storing the failure status in a failure status storing unit;

generating a recovery schedule based on the failure status stored in the failure status storing unit; and storing the recovery schedule in the recovery schedule storing unit.

8. The cloud service recovery time prediction method according to claim 6, comprising:

when storing reservation information, which includes a reservation start time of a computing resource shared by and exclusively used between a plurality of users in association with the user of the computing resource, in a resource reservation information storing unit, determining whether the computing resource used by each user is free, based on the reservation information stored in the resource reservation information storing unit, and storing the reservation information, which includes a recovery time of the free computing resource as a reservation start time, in the resource reservation information storing unit based on the recovery schedule; and predicting the recovery time of the cloud service used by the user, based on the recovery schedule and the reservation information stored in the resource reservation information storing unit.

9. The cloud service recovery time prediction method according to claim 6, comprising:

searching a recovery schedule candidate maximizing or minimizing a targeting index under a constraint represented by recovery schedule constraint information specifying a constraint condition of a recovery schedule based on a dependency relation between computing resources or a resource recovery request of a user;

updating a corresponding recovery schedule stored in a resource recovery schedule storing unit by the recovery schedule; and predicting the recovery time of the cloud service used by the user, based on the updated recovery schedule.

10. A non-transitory computer readable information recording medium storing a cloud service recovery time prediction program applied to a computer that predicts a recovery time when a failure occurs in a plurality of types of computing resources provided in a cloud service or in an application service that is a service provided in the cloud service, the cloud service recovery time prediction program, when executed by a processor, performs a method for:

identifying computing resources and application services used by a user of the cloud service, with reference to a resource usage profile storing unit storing a resource usage profile specifying a computing resource used by each user of the cloud service with respect to each user, from the resource usage profile stored in the resource usage profile storing unit, extracting a recovery schedule from a recovery schedule storing unit storing a recovery schedule specifying a schedule for recovering the computing resources or the application service with respect to each computing resource type or each application service when a failure occurs in the computing resources or the application service, and predicting a recovery time of the cloud service used by the user by predicting a time for recovering all specified computing resources or an application service, based on the extracted recovery schedule; and presenting the predicted service recovery time to the user, wherein the predicted service recovery time indicates an expected service recovery time at which the cloud service is predicted to be available to the user after the recovery of all the associated failed resources and application services.

11. The computer readable information recording medium according to claim 10, wherein the processor further performs a method for:

surveying a failure status of each computing resource or application service and storing the failure status in a failure status storing unit; and generating a recovery schedule based on the failure status stored in the failure status storing unit, and storing the recovery schedule in the recovery schedule storing unit.

* * * * *